US011804245B2

(12) United States Patent
Marzorati et al.

(10) Patent No.: US 11,804,245 B2
(45) Date of Patent: Oct. 31, 2023

(54) VIDEO DATA SIZE REDUCTION

(71) Applicant: KYNDRYL, INC., New York, NY (US)

(72) Inventors: Mauro Marzorati, Lutz, FL (US); Jennifer M. Hatfield, San Francisco, CA (US); Jill S. Dhillon, Laguna Niguel, CA (US); Jeremy R. Fox, Georgetown, TX (US)

(73) Assignee: Kyndryl, Inc., New York, NY (US)

( * ) Notice: Subject to any disclaimer, the term of this patent is extended or adjusted under 35 U.S.C. 154(b) by 181 days.

(21) Appl. No.: 17/581,698

(22) Filed: Jan. 21, 2022

(65) Prior Publication Data

US 2023/0298627 A1 Sep. 21, 2023

(51) Int. Cl.
*G11B 27/031* (2006.01)
*G06V 20/40* (2022.01)
(Continued)

(52) U.S. Cl.
CPC ............ *G11B 27/031* (2013.01); *G06V 20/41* (2022.01); *G06V 20/46* (2022.01); *G06V 20/49* (2022.01);
(Continued)

(58) Field of Classification Search
CPC .... G11B 27/031; G11B 27/005; G06V 20/49; G06V 20/46; G06V 20/41; G10L 15/1815;
(Continued)

(56) References Cited

U.S. PATENT DOCUMENTS 8,023,751 B1 9/2011 Reisman
2014/0270709 A1* 9/2014 Mayblum ........ H04N 21/47205
386/282

(Continued)

FOREIGN PATENT DOCUMENTS

CN 1740990 B 3/2006
WO WO2021146703 A1 7/2021

OTHER PUBLICATIONS

Marrero, T., "Hillsborough Sheriff faces challenge from the right in Republican primary", Tampa Bay Times, Aug. 7, 2020, 5 pgs. Retrieved on Jan. 20, 2022 from Internet URL: https://www.tampabay.com/florida-politics/elections/2020/08/07/hillsborough-sheriff-faces-challenge-from-the-right-in-republican-primary/.

(Continued)

*Primary Examiner* — Sunghyoun Park
(74) *Attorney, Agent, or Firm* — CANTOR COLBURN LLP; Erik Swanson

(57) ABSTRACT

Methods, computer program products, and systems are presented. The method computer program products, and systems can include, for instance: storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

20 Claims, 10 Drawing Sheets

(51) Int. Cl.
  *G10L 25/57* (2013.01)
  *G11B 27/00* (2006.01)
  *H04N 5/91* (2006.01)
  *G10L 15/18* (2013.01)
  *G10L 25/63* (2013.01)
  *H04N 7/01* (2006.01)

(52) U.S. Cl.
  CPC .......... *G10L 15/1815* (2013.01); *G10L 25/57* (2013.01); *G10L 25/63* (2013.01); *G11B 27/005* (2013.01); *H04N 5/91* (2013.01); *H04N 7/0117* (2013.01)

(58) Field of Classification Search
  CPC ........... G10L 25/57; G10L 25/63; H04N 5/91; H04N 7/0117
  See application file for complete search history.

(56) References Cited

U.S. PATENT DOCUMENTS

| | | | |
|---|---|---|---|
| 2017/0206929 A1* | 7/2017 | Jo | H04N 5/93 |
| 2018/0084228 A1 | 3/2018 | Pellom et al. | |
| 2018/0225520 A1 | 8/2018 | Lin et al. | |
| 2020/0293783 A1* | 9/2020 | Ramaswamy | H04N 21/23418 |
| 2020/0380261 A1* | 12/2020 | Chandran | G06V 10/764 |
| 2020/0404221 A1 | 12/2020 | Trundle et al. | |
| 2021/0368217 A1* | 11/2021 | Nir | H04N 21/23805 |

OTHER PUBLICATIONS

"Linux man page", die.net, 3 pgs. Retrieved on Jan. 20, 2022 from Internet URL: https://linux.die.net/man/1/mrtg.

"Variable bitrate", Wikipedia, 3 pgs. Retrieved on Jan. 20, 2022 from Internet URL: https://en.wikipedia.org/wiki/Variable_bitrate.

"A Bit on Bit Rates", Security CameraKing.com, 7 pgs. Retrieved on Jan. 20, 2022 from Internet URL: https://www.securitycameraking.com/securityinfo/a-bit-on-bit-rates/.

"JPG, MP3, MPEG,PDF and Lossy Compression", tylerbrownblog, Jun. 16, 2016, 2 pgs. Retrieved on Jan. 20, 2022 from Internet URL: https://tylerbrownblog.wordpress.com/2016/06/16/jpg-mp3-mpegpdf-and-lossy-compression/.

Mell, Peter, et al., "The NIST Definition of Cloud Computing", NIST Special Publication 800-145, Sep. 2011, Gaithersburg, MD, 7 pgs.

* cited by examiner

VIDEO DATA SIZE REDUCTION

BACKGROUND

Embodiments herein relate generally to video data and specifically to video data size reduction.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

In another aspect, a computer program product can be provided. The computer program product can include a computer readable storage medium readable by one or more processing circuit and storing instructions for execution by one or more processor for performing a method. The method can include, for example: storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

In a further aspect, a system can be provided. The system can include, for example a memory. In addition, the system can include one or more processor in communication with the memory. Further, the system can include program instructions executable by the one or more processor via the memory to perform a method. The method can include, for example: storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
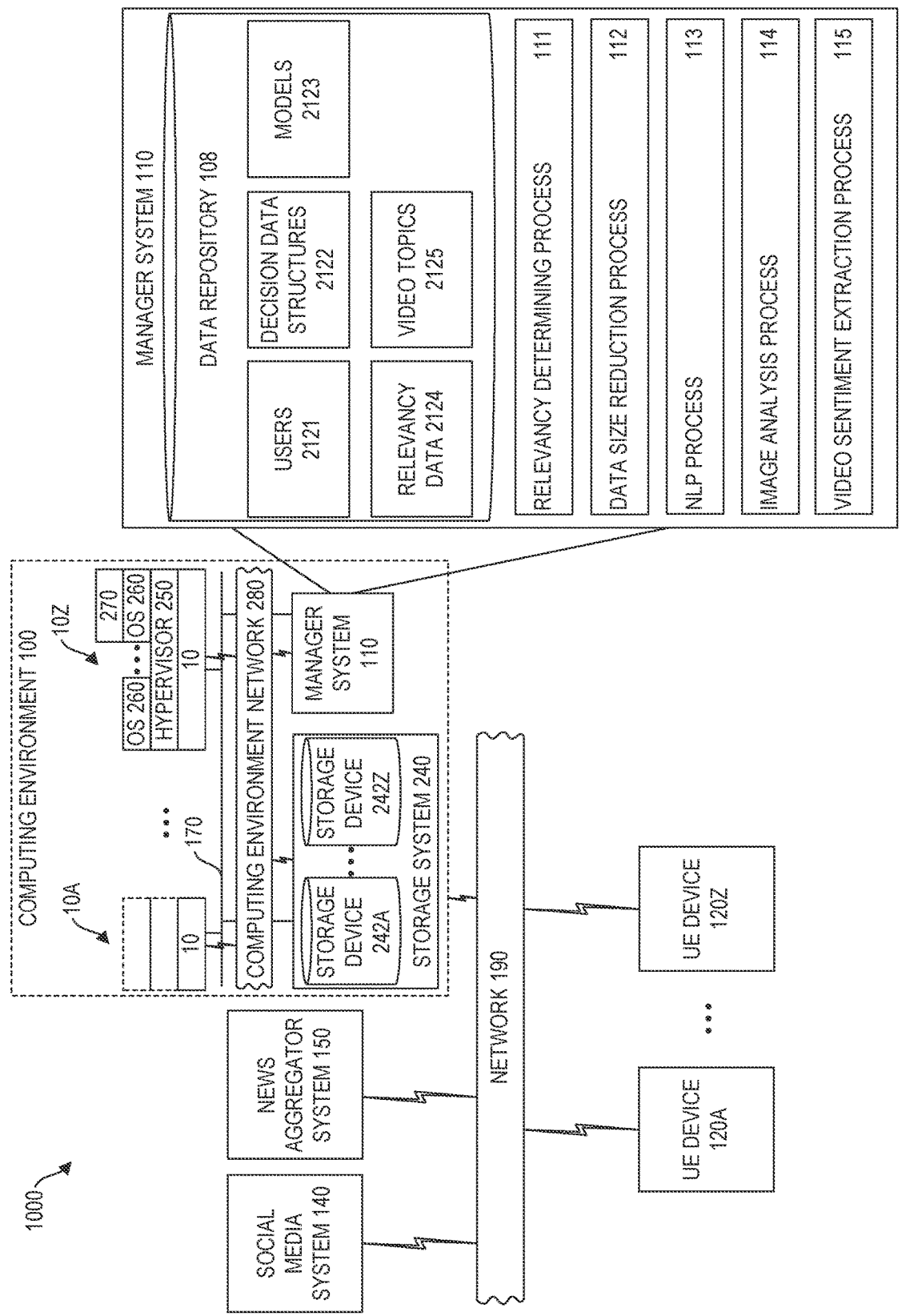
FIG. 1 depicts a system having a computing environment, a plurality of user equipment UE devices, a social media system, and a news aggregator system, according to one embodiment.

System 1000 for use in performing intelligent size reduction of video file data is illustrated in reference to FIG. 1. System 1000 can include computing environment 100 having manager system 110, user equipment UE devices 120A-120Z, social media system 140, and news aggregator system 150. Computing environment 100, user equipment UE devices 120A-120Z, social media system 140, and news aggregator system 150 can include computing node-based apparatus in communication with one another via network 190. Network 190 can be a physical network and/or a virtual network. A physical network can be, for example, a physical telecommunications network connecting numerous computing nodes or systems such as computer servers and computer clients. A virtual network, for example, can combine numerous physical networks or parts thereof into a logical virtual network. In another example, numerous virtual networks can be defined over a single physical network.

Computing environment 100, user equipment UE devices 120A-120Z, social media system 140, and news aggregator system 150, in one embodiment, can be external and remote from one another. In another embodiment, computing environment 100 can be co-located with one or more of UE devices 120A-120Z, social media system 140, and news aggregator system 150.

Video data as referred to herein can be stored in a video file format. A video file format can refer to a type of file format for storing digital video data on a computer system. A video file can include video data in a video coding format, along with audio data in an audio coding format, e.g., OPUS™ set forth in Request For Comments (RFC) 6716, which is a standard audio coding format provided by the Internet Engineering Task Force (IETF). Video file data can include, e.g., synchronization, information subtitles, and metadata. Video file formats for use in formatting video file data herein can include, e.g., GIF (.GIF), multiple image network graphics (.MNG), AVI (.AVI), real media (.RM), advanced system format (.ASF), MPEG (.MPG), and flash video (.FLV). Audio data of the video data file can define an audio data feed.

Each of the different UE devices 120A-120Z can be associated to a different user. A UE device of UE devices 120A-120Z can be a computing node device provided by a client computer, e.g., a mobile device, e.g., a smartphone or tablet, a laptop, smartwatch or PC that runs one or more program, e.g., including a web browser for opening and viewing web pages.

Computing environment 100 can include, e.g., various computing nodes 10 provided by physical computing nodes that can host various applications, including application 270, which application 270 can be configured for servicing user video data requests, e.g., requests to archive video data files into storage, and/or for playback with rendering on a UE device of the user. For example, application 270 can respond to video data requests initiated by a user using the user UE device for uploading and archiving video data files of a user. Computing environment 100 can include storage system 240 which can be provided by a multitiered storage system having various tiers of storage.

Computing environment 100 can include manager system 110. Manager system 110 can include data repository 108 and can be configured to run various processes.

Data repository 108 can store various data. Data repository 108 in users area 2121 can store data on users of system 1000. In users area 2121, there can be stored registration data of users, which can include, e.g., contact information of users including name, social media address data of users, including messaging service address data of users, permissions of users, and the like.

Data repository 108 in decision data structures area 2122 can store decision data structures for return of action decisions. Decision data structures area 2122 can include, for example, decision tables and decision trees for return of action decisions.

Data repository 108 in models area 2123 can include, e.g., predictive models trained by machine learning processes. Predictive models stored in models area 2123 can include, e.g., predictive models for predicting relevancy of topics associated to a user. Predictive models in models area 2123 can also include one or more predictive model for predicting a global relevancy of a topic, e.g., based on data feed data from news aggregator system 150. Predictive models stored in models area 2123 can also include, e.g., one or more predictive model for use in invoking investigation by manager system 110.

Data repository 108 in relevancy data area 2124 can store relevancy data that specifies a relevance of topics associated to assets that are processed by manager system 110. Through a deployment period of manager system 110, manager system 110 can digest and process various assets that are obtained by manager system 110. The assets can be subject to processing for extraction of relevancy data, e.g., topic data associated to assets that are consumed. Relevancy data area 2124 can store data specifying, e.g., identifier assigned to the asset, type of asset, any owner associated to the asset such as a user owner who was a user of system 1000, asset size data associated to the asset, and relevancy data specifying, e.g., relevancy of various assets that have been extracted from the asset.

Manager system 110 can run various processes. Manager system 110 running relevancy determining process 111 can determine a relevancy, e.g., of a topic associated to a user and/or a global relevancy of a topic. Manager system 110 running relevancy determining process 111 can include manager system 110 querying one or more predictive model stored in models area 2123.

Manager system 110 running data size reduction process 112 can reduce a data size of a video data file. Manager system 110 running data size reduction process 112 can include manager system 110 performing a certain specified action for data size reduction in dependence on a relevancy score that has been assigned to a topic.

Data repository 108 in video topics area 2125 can store data on topics that have been extracted from processed video data. Video topics area 2125 can store, e.g., identifiers for video data files that have been subject to processing for topic extraction and data specifying topics that have been extracted from frames of such video file data defining a video data file. Video data of users having user data stored in users area 2121 can be subject to natural language processing for extraction of topics. For example, in one embodiment, topics associated to a video file can be extracted on a frame-by-frame basis, in one example, and/or on a scene-by-scene basis.

Manager system 110 running data size reduction process 112, according to one embodiment, can perform comparing of topics associated to a user to topics extracted from video and take action responsively to the comparing.

Manager system 110 running natural language processing (NLP) process 113 can include manager system 110 extracting NLP parameter values from processed asset subject to NLP processing by NLP process 113. Manager system 110 can run NLP process 113 to process data for preparation of records that are stored in data repository 108 and for other purposes. Manager system 110 can run Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g., polar sentiment NLP output parameters, e.g., "negative," "positive," and/or non-polar NLP output sentiment parameters, e.g., "anger," "disgust," "fear," "joy," and/or "sadness" or other classification process for output of one or more other NLP output parameters e.g., one of more "social tendency" NLP output parameter or one or more "writing style" NLP output parameter.

By running of NLP process 113, manager system 110 can perform a number of processes including one or more of (a) topic classification and output of one or more topic NLP output parameter for a received message, (b) sentiment classification and output of one or more sentiment NLP output parameter for a received message, or (c) other NLP classifications and output of one or more other NLP output parameter for the received message.

Topic analysis for topic classification and output of NLP output parameters can include topic segmentation to identify several topics within a message. Topic analysis can apply a variety of technologies e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 113 can include manager system 110 returning NLP output parameters in addition to those specification topic and sentiment, e.g., can provide sentence segmentation tags and part of speech tags. Manager system 110 can use sentence segmentation parameters to determine, e.g., that an action topic and an entity topic are referenced in a common sentence, for example.

Manager system 110 can subject various types of assets to natural language processing for extraction of natural language processing parameter values. Assets subject to processing can include, e.g., social media data of a user and UE device data of a user, according to permissions defined by the user, e.g., calendar information. Manager system 110 running NLP process 113 can also include manager system 110 subjecting to natural language processing social media data associated to a user, e.g., messaging data of a user with other users who may or may not be users of system 1000, posts data of the user, and the like. Manager system 110 running NLP process 113 can include manager system 110 subjecting the natural language processing video data files of a user for extraction of topics from such video files, as well as for extraction of relevancy level parameter values associated to such topics wherein such relevancy values are relevancy values associated to the user. Manager system 110 running NLP process 113 can include manager system 110 subjecting to natural language processing news aggregator assets obtained from news aggregator system 150. Extraction of natural language processing parameter values from news aggregator system assets of news aggregator system 150 can include extraction of topics associated to such assets, e.g., online newspapers, online magazines, aggregated social media posts aggregated by news aggregator system 150, and the like.

Manager system 110 running image analysis process 114 can include manager system 110 performing image analysis of frames of image data defining a video data file for return topic classifiers associated to the video data file. In one embodiment, an image analysis service can be provided by IBM Watson® Visual Recognition Services (IBM Watson is a registered trademark of International Business Machines Corporation).

Manager system 110 running video sentiment extraction process 115 can extract a sentiment from video data file using biometric sensor output data. The biometric sensor output data can include, e.g., data output from a camera sensor, acoustic sensor, and/or pulmonary biometric sensor, e.g., heart rate or pulse sensor.

Manager system 110 running video sentiment extraction process 115 can subject an audio data feed of a section of a video data file to speech to text conversion and then can subject the returned text to natural language processing by NLP process 113 to extract sentiment parameter values from text associated to a video file data segment.

Manager system 110 running video sentiment extraction process 115 can also or alternatively derive sentiment from a video data file section using speech tone analysis. Manager system 110 running sentiment extraction process 115 can also or alternatively derive sentiment from a video data file section by subjecting video data of the section of facial expression sentiment extraction. Facial expression sentiment extraction can be performed in a manner to protect the anonymity of users subject to facial expression sentiment extraction.

Manager system 110 running video sentiment extraction process 115 can also or alternatively derive sentiment from a video data file section using output data from a pulmonary biometric sensor.

Computing environment 100 can include a plurality of computing nodes 10, which can be provided by physical computing nodes. The respective computing nodes 10 can have software running thereon defining computing node stacks 10A-10Z. Software defining the respective instances of computing node stacks 10A-10Z can be differentiated between the computing node stacks, e.g. some stacks can provide traditional bare metal machine operation, other stacks can include a hypervisor that supports a plurality of guest operating systems (OS) defining respective guest hypervisor-based virtual machines (VMs), other stacks can include container-based VMs, e g running on top of a hypervisor-based VM or running on a computing node stack that is absent of a hypervisor. A plurality of different configurations is possible.

Referring to further aspects of computing environment 100, computing environment 100 can include storage system 240. Storage system 240 can include storage devices 242A-242Z, which can be provided by physical storage devices. Physical storage devices of storage system 240 can include associated controllers. Storage devices 242A-242Z can be provided, e.g., by hard disks and Solid-State Storage Devices (SSDs). Storage system 240 can be in communication with computing node stacks 10A-10Z by way of a Storage Area Network (SAN) and/or a Network Attached Storage (NAS) link.

According to one embodiment, computing environment 100 can include fibre channel network 170 providing communication between respective computing node stacks 10A-10Z and storage system 240. Fibre channel network 170 can include a physical fibre channel that runs the fibre channel protocol to define a SAN. NAS access to storage system 240 can be provided by computing environment network 280 which can be an IP-based network. Manager system 110 can be in communication with computing node stacks 10A-10Z, by way of computing environment network 280.

Computing environment 100 can be configured to provide cloud computing services. Computing environment 100 can be provided, e.g., by one or more data center. Computing environment 100 can host application 270 for responding to video data management requests of users. Application 270 is shown as being hosted by computing node stack 10Z having a particular hosting configuration for illustrative purposes. However, it is understood that application 270 can be migrated to a different computing node stack or that the particular provisioning of computing node stack 10Z can be dynamically changed and further instances of application 270 can be increased or decreased. In the particular computing node stack 10Z, application 270 runs on a guest operating system (OS) 260 defining a hypervisor-based VM, which hypervisor-based VM runs on hypervisor 250, which hypervisor runs on computing node 10, which can be provided by physical computing node.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider or an email delivery system. Manager system 110 can include a messaging system in one embodiment. During a process of registration wherein a user of system 1000 registers as a registered user of system 1000, a user sending registration data can send with permission data defining the registration data a permission that grants access by manager system 110 to data of the user within social media system 140. On being registered, manager system 110 can examine data of social media system 140, e.g., to determine whether first and second users are in communication with one another via a messaging system of social media system 140. A user can enter registration data using a user interface displayed on a client computer device of UE devices 120A-120Z. Entered registration data can include, e.g., name, address, social media account information, other contact information, biographical information, background information, preferences information, and/or permissions data, e.g., can include permissions data allowing manager system 110 to query data of a social media account of a user provided by social media system 140 including messaging system data and any other data of the user. When a user opts-in to register into system 1000 and grants system 1000 permission to access data of social media system 140, system 1000 can inform the user as to what data is collected and why, that any collected personal data may be encrypted, that the user can opt out at any time, and that if the user opts out, any personal data of the user is deleted.

News aggregator system 150 can be provided by a news aggregator, e.g., a server with appropriate software for aggregating syndicated web content such as online newspapers, blogs, or podcasts in a central location for easy access. News aggregator system 150 can include a rich site summary (RSS) synchronized subscription system. RSS uses extensible markup language (XML) to structure pieces of information to be aggregated in a feed reader. Distributed updates can include, e.g., journal tables of contents, podcasts, videos, and news items. News aggregator system 150 can include human selected and entered content as well as automatically selected content, selected with use of auto-selection algorithms. Rich site summary (RSS) feeds can include text and metadata that specifies such information as publishing date and author name.

Figure 2:
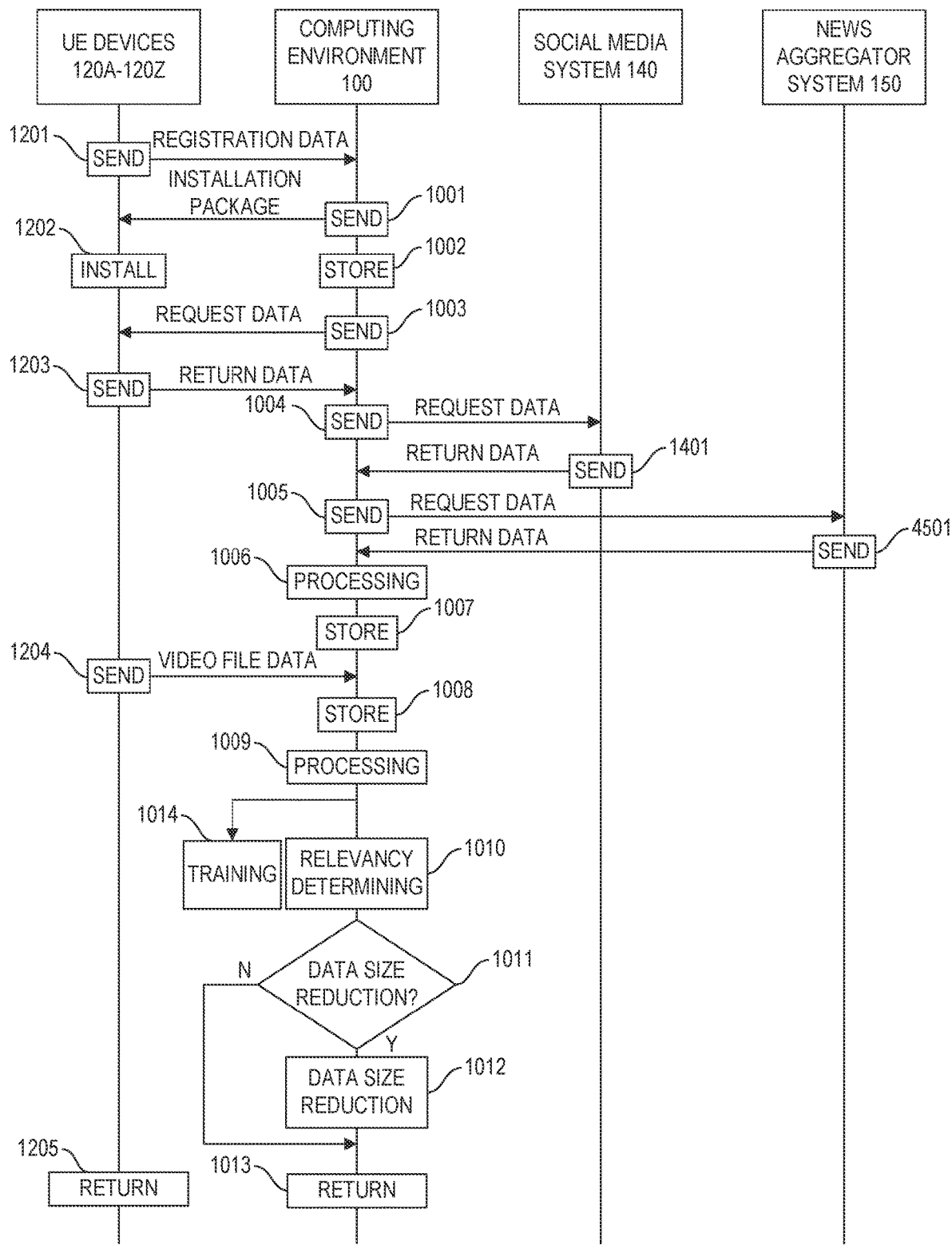
FIG. 2 is a flowchart depicting operation of a computing environment interoperating with UE devices, a social media system, and a news aggregator system, according to one embodiment.

A method for performance by computing environment 100 interoperating by UE devices 120A-120Z, social media system 140, and news aggregator system 150 is set forth in reference to the flowchart of FIG. 2. Functions described in reference to computing environment 100 can be performed by one or more processor, e.g., one or more processor associated to application 270, and one or more processor associated to manager system 110. Embodiments herein recognize that in some embodiments, the functions associated to application 270 and manager system 110 can be co-located, e.g., can be run within a common VM running on a common computing node 10 or within different VMs running on a common computing node 10, according to some examples.

At block 1201, UE devices 120A-120Z can be sending registration data specifying parameter values for registering respective users associated to respective UE devices 120A-120Z as registered users of system 1000. The registration data sent at block 1201 can be received at computing environment 100, e.g., by application 270. In response to receipt of the registration data sent at block 1201, e.g., by application 270, application 270 can route the registration data for receipt by manager system 110, and manager system 110 can store the received registration data into users area 2121 at store block 1002. On registration of a user, manager system 110 can be configured to assign a universally unique identifier (UUID) to each registered new user. Registration data stored in users area 2121 can include, e.g., contact data, e.g., specifying name, address, social media address, messaging system address, and the like. Registration data can also include volunteered data, e.g., demographic data such as demographic data specifying, e.g., age of a user and geospatial residence of the user in terms of coordinates or in terms of geographical names that can be mapped to coordinates by manager system 110.

Registration data sent at block 1201 and stored at block 1002 can include permissions data that specifies permissions defined by a user that permits manager system 110 to use the personal data of a user. Permissions data can define permissions, e.g., to permit manager system 110 to use social media data of a user or on client data of a user from a user's UE device 120A-120Z. Permissions data can also include such data as permissions data permitting manager system 110 to use location data of a user, as well as permissions permitting manager system 110 to process video data uploaded by a user.

Further in response to receipt of registration data sent by UE devices 120A-120Z at block 1201, computing environment 100 at block 1001, e.g., by manager system 110, can send an instance of an installation package to respective ones of UE devices 120A-120Z which have sent registration data. Installation packages can include, e.g., software libraries and executable code which, when installed on UE devices 120A-120Z, facilitate participation of UE devices 120A-120Z in system 1000. In response to receipt of the installation packages sent at block 1001, UE devices 120A-120Z can install the respective installation packages at install block 1202. In some embodiments, installation packages can be lightweight or even nonexistent in the case that system 1000 is configured to operate with use of UE devices 120A-120Z operating in an out-of-box configuration.

On completion of store block 1002, computing environment 100, e.g., by manager system 110, can send request data for data assets at block 1003, 1004, and 1005. The request data sent at block 1003 can be sent to UE device 120A for return of asset data from UE devices 120A-120Z. The asset data can include, e.g., calendar data of UE device 120A, application data of UE devices 120A-120Z, and location data of UE devices 120A-120Z to the extent there are associated permissions defined within registration data for the particular UE devices specified in the registration data sent at block 1201. In response to the request data sent to UE devices 120A-120Z, UE devices 120A-120Z at send block 1203 can send return data in the form of asset data to computing environment 100, e.g., for receipt by manager system 110, which sent the request data at block 1003.

The request data sent at block 1004, e.g., by manager system 110, can be sent to social media system 140. In response to the social media system receipt of the request data, social media system 140 at send block 1401 can send return data. The request data sent at block 1004 can include request data for data assets of social media system 140, e.g., the asset data can include such data as posts data for particular users who have registered with system 1000 and messaging system data involving messages by users who are associated to UE devices 120A-120Z with other users including, e.g., other registered users.

At block 1005, computing environment 100 by manager system 110 can send request data to news aggregator system 150. News aggregator system 150 at send block 4501 can send return data back to computing environment 100, e.g., to manager system 110, for receipt by manager system 110.

In response to the returned asset data sent at blocks 1203, 1401, and 4501, computing environment 100 by manager system 110 at block 1006 can perform processing of the returned assets for extraction of parameter values specifying attributes of the assets. In response to the returned asset data sent at blocks 1203, 1401, and 4501, computing environment 100 by manager system 110 at block 1006 can perform processing of the returned assets by natural language processing for extraction of natural language processing parameter values, e.g., extracted topic parameter values extracted by processing of returned asset data for return of extracted topics. Topics herein can include general topics as well as specific topics including specific topics that map to keywords included within a string of text-based data subject to natural language processing.

On completion of performance of natural language processing at processing block 1006, computing environment 100 by manager system 110 can proceed to block 1007. At block 1007, manager system 110 can store returned extracted natural language processing parameter values into relevancy data area 2124 of data repository 108 associated to manager system 110. Within relevancy data area 2124, there can include data specifying such information as identifiers for assets that have been subject to processing at block 1006, type information as to the type of asset, size information for the asset subject to processing, and topic frequency that specifies the frequency of various topics that have been extracted by subjecting the asset to natural language processing.

Referring to the flowchart of FIG. 2, UE devices 120A-120Z at send block 1204 can be sending video file data, e.g., to application 270 which provides a video file storage service to users. At block 1204, UE devices 120A-120Z can be sending video data defining video data file data for uploading into computing environment 100. In one embodiment, application 270 running in computing environment 100 can be an application providing a customer service that permits users to upload for storage video data files that have been created or otherwise obtained by users.

In response to request data defined by a user, video file data sent at send block 1204 can be stored in storage system 240 of computing environment 100. Storage system 240 of computing environment 100 can be a multitiered computing environment. Multitiered storage system 240 can include multiple tiers of storage, e.g., a first storage device of a first tier and one or more lower tiers of storage devices. The higher tiered storage devices (e.g., Tier 0), in general, can be faster acting and can have higher associated cost than lower tiered storage devices, which can have lower costs and can be slower acting. In storage system 240, storage can be provided in tiers of storage. Tiered storage is an underlying principle of information lifecycle management (ILM). Tiered storage is a storage networking method where data is stored on various types of storage volumes based on performance availability and recovery requirements. In one embodiment, Tier 0 storage can be used for mission critical files. Tier 0 storage devices can be provided by solid state storage devices, which can be faster than Tier 1 storage devices, which can be faster that Tier 2 storage devices, which can be faster that Tier 3 storage devices. In one embodiment, Tier 1 storage can be used for mission critical, recently outsourced, or top secret files and can include expensive high quality media storage devices. Tier 2 storage volumes can be used to store seldom used files and can include less expensive media devices. Tier 3 storage volumes can be used to store unclassified files or rarely used files. In one scheme, Tier 3 storage volumes can include slow spinning hard disk drives. In a video playback rendering services, Tier 0 storage can be provided to facilitate rapid access and rendering playback of user video data files.

In one embodiment, methods herein can be used to iteratively reduce data size of video file data stored on a storage device over time. In one embodiment, the storage device can be tiered storage device in storage system 240 having a tier higher than at least one other storage device in storage system 240. In one embodiment, the storage device can be a highest tiered storage device of storage system which is available to a user who uses a service provided by application 270 to facilitate archiving of video file data. The highest tiered storage can provide advanced video data services to a user, e.g., the option for fast playback for rendering on a UE device of a customer user.

Embodiments herein recognize that in one scenario, customer users as well as service providers can benefit from a service that provides data size reduction of video file data stored in a priority tiered storage device of storage system 240 for fast response (e.g., including video playback for rendering). For example, such data size reduction functionality can make available to that customer user additional storage space within a tiered storage space for storage of more relevant data. An enterprise user in turn is able to expand storage services to additional users without deployment of additional hardware. In another use case, methods herein can find use as a general solution to the big data problem to curtail the exhaustion of storage capacities irrespective of storage tier. Customer users can benefit from features herein in other ways. For example, with data size reduction of a video data file herein, a user can more quickly review a video data file for relevant content. Embodiments herein recognize that data size reduction features herein can find use in evidence review applications, e.g., by law enforcement entities and the like.

In one use case, computing environment 100 by manager system 110 at storage block 1008 can store video file data defining a video data file sent at block 1204 into a priority tiered storage device while simultaneously storing the same video data file into a second storage device that is of a lower tier relative to the priority storage device.

In such an embodiment, a full-size copy of an initially stored video data file can be stored in storage system 240 to permit access to content from the full-size version of the video data file in the case an action decision is triggered to restore video content from an original full-size version of a stored video data file. In other use cases, there may be no simultaneous storage of a video data file into multiple storage devices on initial storage of a video data file. In such embodiments, the option to recover content from a full-sized version of a stored video data file may not be available after initial storage of the video data file.

While the block diagram and flowchart of FIGS. 1 and 2 depict a use case in which there is storage of a video data file in computing environment 100 that defines a server-side system which can be provisioned, e.g., as a cloud-based server-sized system, embodiments herein can also be used in other scenarios. For example, video data file data size reduction processes by manager system 110 herein can be carried out, e.g., by manager system 110 co-located on a local user equipment device, e.g., a client UE device such as a smart phone or other portable UE device that might have limited storage capability.

On completion of store block 1008, manager system 110 can proceed to block 1009. At block 1009, manager system 110 can perform processing of the video file data sent at block 1204 and subject to storing at block 1008. The processing at block 1009 can include, e.g., video-based topic extraction processing. Manager system 110 running image analysis process 114 can include manager system 110 performing image analysis of frames of image data defining a video data file for extraction and return topic classifiers associated to the video data file. In one embodiment, an image analysis service can be provided by IBM Watson® Visual Recognition Services (IBM Watson is a registered trademark of International Business Machines Corporation). For example, in the case manager system 110 processes an image representation of a dog collar, extracted data may be provided as follows. Returned content can include classification content specifying topic classifications and confidence levels associated with the various topic classifications for an analyzed image such as image content specifying an object. Classification content can include various classifications such as the topic classifications as follows: ring shaped (confidence level 0.81), canine (confidence level 0.75), metallic (confidence level 0.62), and belt (confidence level 0.53). Returned content returned as a result of subjecting an image of a candidate related product to image analysis can include markup language content which can include markup language text and syntax specifying the various topic classifications and confidence levels of image content to facilitate processing by a downstream of one or more process interface.

Image-based topic extraction performed at block 1009 can include deriving topics from images defined within frames of data of the transmitted video file data sent at block 1204. Processing at block 1009 can also include image recognition, e.g., to recognize images of objects represented in frames of image data defining video file data sent at block 1204. In one embodiment, manager system 110 running an image recognition process to examine spatial image data representing a feature of interest can include manager system 110 employing pattern recognition processing using one or more of, e.g., feature extraction algorithms, classification algorithms, and/or clustering algorithms. In one embodiment, manager system 110 running an image recognition process can include performing of digital image processing. Digital image processing can include, e.g., filtering, edge detection, shape classification, optical character recognition (OCR), and/or encoded information decoding.

Manager system 110 running processing block 1006 can also or alternatively include manager system extracting topics from a video data file, e.g., on a section by section basis, by running of NLP process 113. In one example, manager system 110 can subject an audio data feed associated to a video data file to speech to text conversation to extract a text transcript of the section, then can subject the text transcript to natural language processing by NLP process 113 to extract topics from the text, so that there are extracted topics associated to conversations participated in by users who are represented in a video data file section.

On completion of block 1009, manager system 110 within computing environment 100 can proceed to block 1014 and block 1010. At block 1014, manager system 110 can perform training of one or more predictive model by machine learning using extracted data extracted as a result of processing block 1006 and/or block 1009. Simultaneously with branching to perform training at block 1014, manager system 110 can perform relevancy determining at block 1010.

Figure 3A:
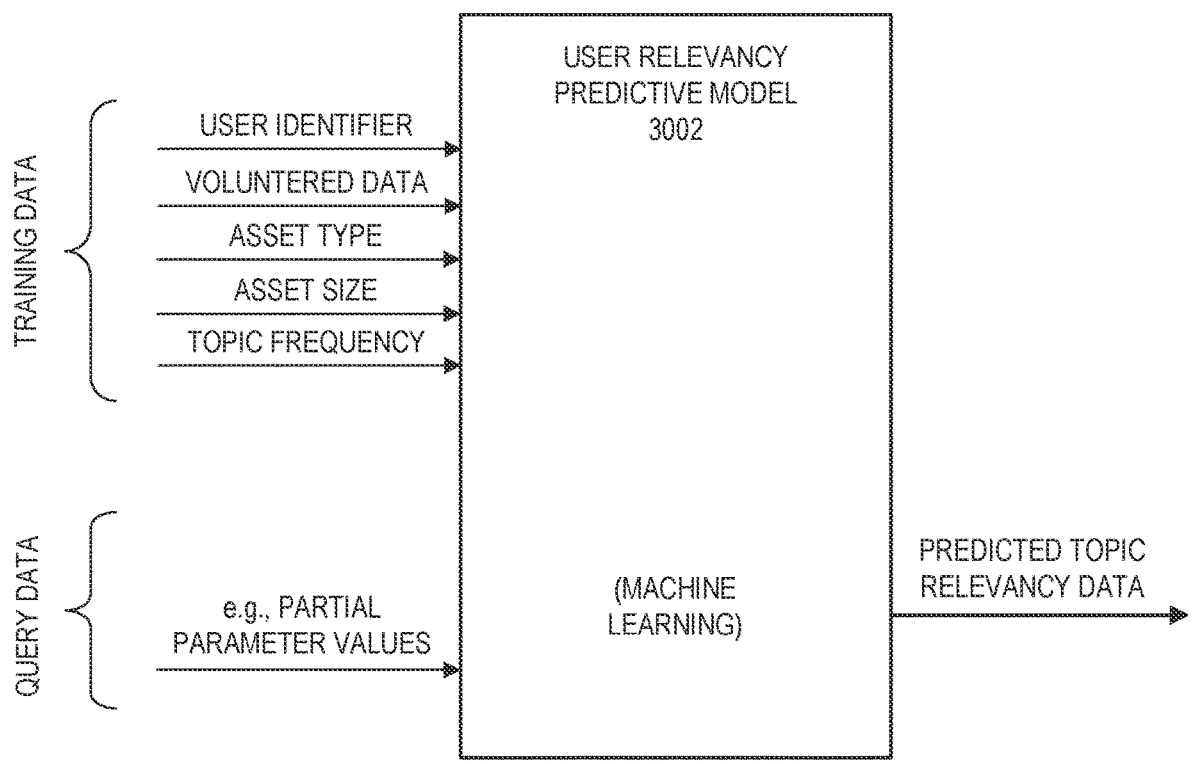
FIG. 3A depicts a predictive model, according to one embodiment.

In one embodiment, the relevancy determining at block 1010 can include querying a predictive model subject to training at training block 1014. Referring to training block 1014, various predictive models can be trained with use of extracted data resulting from processing block 1006 and/or processing block 1009. FIG. 3A illustrates a user relevancy predictive model 3002 for use in predicting a relevancy of various topics associated to a given user.

In one embodiment, manager system 110 can maintain and train an instance of user relevancy predictive model 3002 for each registered user of system 1000. User relevancy predictive model 3002 can be trained with iterations of training data and once trained, user relevancy predictive model 3002 can be configured to respond to query data. Iterations of training data for training user relevancy predictive model 3002 can include data associated to a certain asset subject to processing at block 1006 and/or block 1009. An iteration of training data for training user relevancy predictive model 3002 can include data associated to one certain asset. An iteration of training data for training user relevancy predictive model 3002 can include, e.g., (a) a user identifier associated to the asset, e.g., a calendar asset from a user device, a social media asset such as a post or message data; (b) volunteered data, e.g., demographic data specified by user within registration data; (c) asset type, e.g., social media asset, social media post, social media message, video data file, calendar, and the like; (d) asset size; and (e) topic frequency associated to the asset. The topic frequency parameter value can include an array of data values specifying frequencies of topics within an asset subject to processing.

Iterations of training data for training user relevancy predictive model 3002 can include iterations of historical data of topics extracted from historical assets subject to processing by manager system 110. User relevancy predictive model 3002, once trained, is able to respond to query data. Query data for querying user relevancy predictive model 3002 can include, e.g., partial parameter values, e.g., in one example, a parameter value for querying user relevancy predictive model 3002 can include a user identifier, e.g., the user identifier for whom it is desired that a set of topics of interest to the user be extracted. In response to the described query data comprising a user identifier, user relevancy predictive model 3002 can output a set of topics in a ranked ordered list based on the frequency of the topic appearing within assets associated to the user. The frequency of topics associated to an asset of a user can be used to provide a measure of relevancy to the user.

In response to the described query data, user relevancy predictive model 3002 can output a list of topics with the predicted frequency of topic being output and associated to each respective topic. The predicted frequency can be used to specify as a measure of relevancy score of the topic to the user with greater frequency of the topic indicating greater relevancy to the user. In one aspect, user relevancy predictive model 3002 can be used to return predictions as to topics that are relevant to a user, even where the user is a new user, and training data for the new user has not been used for training user predictive model.

Where the user is a new user and training data sufficient for return of predictions with threshold satisfying confidence levels has not been applied to user relevancy predictive model 3002, user relevancy predictive model 3002 can be used to provide predictions as to the users preferred topics with use of query data that is provided by volunteer data, e.g., demographic data volunteered by the user when registering and included within registration data sent at block 1201. In response to being queried with query data provided by demographic data, user relevancy predictive model 3002 can return predictions as to preferred topics of users sharing the same demographic data with the specified query data.

Training data extracted from a variety of different assets can be used for training of user relevancy predictive model 3002, including, e.g., asset data from a UE device of the user, e.g., calendar data, application data, sensor data and the like, social media data, e.g., posts data or message data of a user, and video file data, that is uploaded video file data of video data files such as a video data file uploaded by a user at block 1204 can be subject to topic extraction at block 1009. Objects returning from optical image recognition pattern recognition can be mapped to topics using an object to topic mapping table, for example.

Figure 3B:
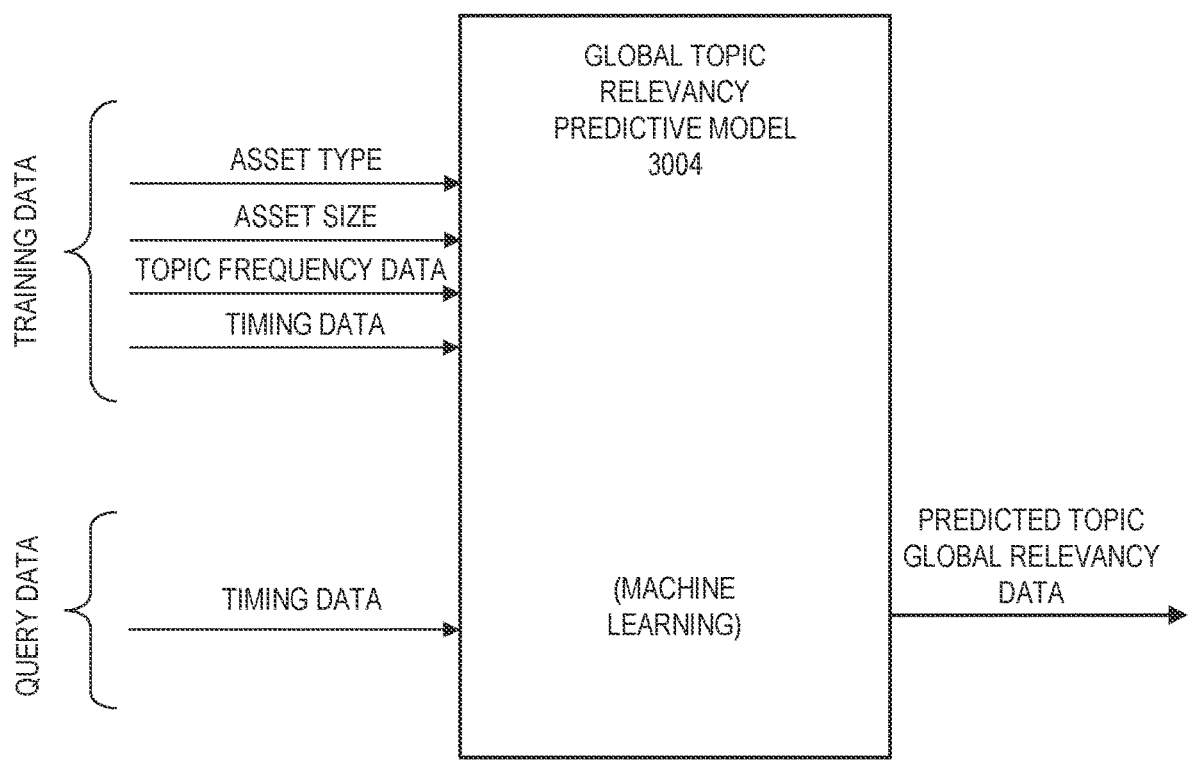
FIG. 3B depicts a predictive model, according to one embodiment.

Training at training block 1014 can also include training of predictive model of global topic relevancy predictive model 3004 as shown in FIG. 3B. Global topic relevancy predictive model 3004 shown in FIG. 3 can be a predictive model trained with machine learning training data to return in association with a list of topic relevancy scores that indicate the global relevancy of respective topics in the topic list. Global topic relevancy predictive model 3004 can be trained with iterations of training data and once trained can be configured to be responsive to query data.

Global topic relevancy predictive model 3004 can be trained with iterations of training data. In one embodiment, each iteration of training data can be associated to one asset that has been subject to processing at processing block 1006. An iteration of training data for training global topic relevancy predictive model 3004 can include (a) asset type for the asset subject to processing at block 1006; (b) asset size; (c) a parameter value indicating topic frequency data for a list of topics extracted by processing of the asset identified; and (d) timing data. The timing data can reference a timestamp specifying the time of creation, e.g., publishing of the asset subject to processing at processing block 1006. Embodiments herein recognize that global topics can exhibit an ebb and flow of relevancy, with some topic relevancy increasing over time and some topics decreasing in relevance over time. Some topics can increase rapid growth or rapid decline in relevance. Some topics can exhibit slow increase in relevance or slow decline in relevance. In one embodiment, global topic relevancy predictive model 3004 can be configured to perform regression analytics which can be useful in performing predictions with respect to timewise time series data.

Global topic relevancy predictive model 3004, once trained, can be subject to query data. Query data for querying global topic relevancy predictive model 3004 can include a timing data that specifies a future time period, e.g., time $T=TC+1$ where TC is the current time. In response to the application of the described query data, global topic relevancy predictive model 3004 can output a prediction. The prediction output by global topic relevancy predictive model 3004 can include, e.g., a list of predicted topics extracted from news aggregator system data sources. With the list of topics, there can be associated predicted topic frequency values, which topic frequency values can be used as a measure of relevance with higher predicted topic frequencies indicating higher relevance and relatively lower topic frequencies indicating relatively lower relevance.

On completion of processing block 1009 simultaneously with branching to training at training block 1014, manager system 110 can proceed to relevancy determining block 1010. Manager system 110 performing relevancy determination determining at block 1010 can include manager system 110 querying user relevancy predictive model 3002 for return of a list of topics and data specifying the relevancy of such topics associated to a user. Manager system 110 running relevancy determining process block 1010 can also query global topic relevancy predictive model 3004 to return a list of topics and data indicating the relevancy of such topics from a global (all user's perspective). On completion of relevancy determining at block 1010, manager system 110 can proceed to block 1011. At block 1011, manager system 110 can ascertain whether data size reduction processing has been activated. In one embodiment, data size reduction processing can be configured to be performed at timed intervals, e.g., once a week, once a month, or once a year. In such manner, video data files that are just recently uploaded will remain in their full original data size state for a period of time after initial uploading, and only after a delay will be subject to data size reduction processing. Further, in one example, time from upload can be used as a factor for determination of relevance.

Data size reduction processing can also or alternatively be activated, e.g., in response to a request specified by a customer user, e.g., an update, e.g., with an updated registration data or a request specified by an administrator user associated to an enterprise that runs manager system 110. In another use case, data size reduction can be activated at block 1011 in response to a service level upgrade of a customer user or a service level downgrade of a customer user as specified within updated registration data sent by a user during an iterative performance of block 1201. In yet another use case, manager system 110 can activate a data size reduction process in response to an emergency event, e.g., a detected cyberattack, fire, or other natural disaster, which might impact storage capacities as a whole of computing environment 100.

At block 1010, manager system 110 can determine whether data size reduction processing has been activated. On the determination that data size reduction processing has not been activated, manager system 110 can skip data size reduction block 1012 and proceed to return block 1013. At return block 1013, the computing environment and management system can return to a stage preceding block 1001 so that a next iteration of registration data can be received from UE devices of UE devices 120A-120Z. The next iteration of registration data can include updated registration data from existing users or new registration data from new users. Computing environment 100 can be iteratively performing the loop of blocks 1001-1013 for a deployment period of system 1000. At return block 1205, UE devices 120A-120Z can return to a stage prior to block 1201. UE devices 120A-120Z can be iteratively performing the loop of blocks 1201-1205 for a deployment period of system 1000.

If at data size reduction ascertaining block 1011 manager system 110 determines that data size reduction has been activated, (e.g., by determining that the current time matches a scheduled data reduction time) manager system 110 can proceed to block 1012. At data size reduction block 1012, manager system 110 can perform data size reduction of one or more video data file associated to a user.

Data size reduction at block 1012 can be performed in a variety of different ways. In one example, manager system 110 can perform data size reduction of a video data file by reducing a pixel resolution of one or more frame of data defining the video data file. For example, where an original video data file includes frames having a pixel resolution of 2560×1440 (UHD), manager system 110 can reduce the pixel resolution of the specified one or more frame to a new reduced resolution of 1920×1080 (FHD), and in a next iteration to 1280×720 (HD) and so on. In another example, manager system 110 at data size reduction block 1012 can reduce data size of a video data file by removal of one or more frames of image data within a succession of frames. The removal of one or more frames of image data can increase playback speed of a video data file.

In still another example of data size reduction that can be performed by manager system 110 at block 1012, manager system 110 can express a succession of frames of data as a single frame of video image data on the determination that the succession of frames is associated to a common scene. In the described example, data size reduction can include freezing a scene, e.g., by removing frames defining the scene and maintaining a certain single frame from a frame of image data defining a scene and configuring the single frame so that rendering playback time of the single frame is extended from a single frame playback time for the frame when rendering playback of the frame is performed using the original video data file uploaded by a user at block 1204 having an unreduced original data size. In one embodiment, the extended time consumes the rendering time of a set of frames defining the described scene when rendering is performed using the original full-size video data file uploaded at block 1204 and stored at block 1008.

A common scene can be identified by manager system 110, e.g., as a succession of frames sharing a common camera position or, according to an alternative example, a succession of frames having a common camera position where N or fewer object representations move over the succession of frames, or according to another definition, a succession of frames sharing a common camera position where zero objects move during the succession of frames. In the described example, manager system 110 can perform data size reduction at block 1012 by selection of a single frame to represent the succession of frames and by configuration of the video data file so that the single frame is displayed during rendering on a UE device display for an extended rendering time. The extended rendering time can be longer than a baseline rendering time associated a frame of an original video data file prior to any data size reduction. The extended rendering time can be a time associated to the normal playback time of the succession of frames defining a common scene. Embodiments herein can include storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of the reducing the size of file data defining the section of the video data file in dependence on the determining the relevancy of the section of the video data file. In one embodiment, a section of a video data file can be defined by a frame of video image data. In one embodiment, a section of the video data file can be provided by a plurality of frames that define a common scene. In one embodiment, a section of the video data file can be provided by a plurality of successive frames that define a common scene. In one embodiment, a section of the video data file can be provided by a plurality of frames of a predetermined or dynamically determined frame count. In one embodiment, a section of the video data file can be provided by a plurality of successive frames of a predetermined or dynamically determined frame count.

In one embodiment, manager system 110 at block 1012 can perform data size reduction of a video data file on a scene-by-scene basis. In other words, manager system 110 can identify scenes within a video data file and for each scene, can ascertain whether to perform data size reduction and, if data size reduction is to be performed, can determine the manner for performing the data size reduction. Manager system 110 at block 1012 can ascertain the relevance of a section of a video data file, e.g., a scene of a video data file with use of Eq. 1 below.

$$R=F1W1+F2W2+F3W3+F4W4+F5W5 \qquad (Eq.\ 1)$$

Where R is the relevancy score of the scene, F1, F2, F3, F4, and F5 are factors impacting relevance, and W1, W2, W3, W4, and W5 are weights associated to the various factors. Manager system 110 can apply Eq. 1 to ascertain a relevancy of each topic extracted from a scene by use of image-based topic extraction and/or natural language processing topic extraction using an audio feed of a video data file and can aggregate the results returned for the set of topics extracted for a scene. For performing natural language processing topic extraction, manager system 110 can identify start and stop timestamps for the video data defining the scene and can extract an audio segment from the audio feed of the video data file having the same start and stop timestamps. Manager system 110 can subject the audio segment to speech to text conversion, and can subject the resulting text to natural language processing for topic extraction as set forth herein.

According to one example, F1 can be a user topic relevancy factor in dependence on the relevancy of the identified topic within a scene to a user whose video file is being subject to data size reduction processing. For assigning a data value under factor F1, manager system 110 can examine user relevancy data for the identified topic returned by querying predictive model 3002 as described in connection with block 1010. Manager system 110 for signing data values under factor F1 can examine return relevancy data returned by querying of predictive model 3002 as described in connection with relevancy determining block 1010. Manager system 110 can apply scoring values under factor F1 for an identified topic in proportion to the returned relevancy level of the topic to the user.

Factor 2 of Eq. 1 can be a global topic relevancy factor. Manager system can apply scoring values under factor F2 for an identified topic extracted from a scene in proportion to the returned global relevancy returned from the topic which can be ascertained by query of global relevancy predictive model 3004. Manager system 110 can assign a higher than baseline relevancy scoring value under factor F2 in the case that the topic being evaluated using Eq. 1 matches a topic having a threshold exceeding global relevance and can assign a lower than baseline scoring value under factor F2 in the case that the topic being evaluated using Eq. 1 does not have a threshold exceeding global relevance.

Factor F3 of Eq. 1 can be a sentiment factor. Manager system 110 can assign relevancy scores under factor F3 in dependence on an extracted sentiment strength (positive or negative) of a video data file section. Sections having neutral sentiments can be assigned lower scoring values under factor F3 that sections having threshold exceeding (positive or negative) sections. Manager system 110 assigning scoring values under factor F3 can include manager system 110 running video sentiment extraction process 115. Manager system 110 running video sentiment extraction process 115 can extract a sentiment from video data file using biometric sensor output data. The biometric sensor output data can include, e.g., data output from a camera sensor, acoustic sensor, and/or pulmonary biometric sensor, e.g., heart rate or pulse sensor. Manager system 110 running video sentiment extraction process 115 can subject an audio data feed of a section of a video data file to speech to text conversion and then can subject the returned text to natural language processing by NLP process 113 to extract sentiment parameter values from text associated to a video file data segment. Manager system 110 running video sentiment extraction process 115 can also or alternatively derive sentiment from a video data file section using speech tone analysis. Manager system 110 running sentiment extraction process 115 can also or alternatively derive sentiment from a video data file section by subjecting video data of the section of facial expression sentiment extraction. Facial expression sentiment extraction can be performed in a manner to protect the anonymity of users subject to facial expression sentiment extraction. Manager system 110 running video sentiment extraction process 115 can also or alternatively derive sentiment from a video data file section using output data from a pulmonary biometric sensor. For example, a video data file subject to uploading at block 1204 can be captured by a user wearing a pulmonary biometric sensor, and a sensor feed from the sensor can be sent with the video file data sent at block 1204.

For performing natural language processing sentiment extraction, manager system 110 can identify start and stop timestamps for the video data defining the scene and can extract an audio segment from the audio feed of the video data file having the same start and stop timestamps. Manager system 110 can subject the audio segment to speech to text conversion, and can subject the resulting text to natural language processing for sentiment extraction as set forth herein.

Manager system 110 for video data file sentiment extraction for assignment of relevancy values under factor F3 can include manger system 110 running a speech to text process to convert a received audio feed associated to a video data file section into text-based data, which is then subject to natural language processing by NLP process. With use of such described text processing, manager system 110 running NLP process 113 defines a Text Tone Analyzer process which measures the textual transcript of what a user said as they conduct a conversation represented in a video data file. This processing includes analysis of word choice to perform linguistic analysis.

Processing by manager system running video sentiment extraction process 114 need not include converting speech to text. Manager system 110 running video sentiment extraction process 115 can include manager system 110 processing voice samples into sentiment classifications. A speech NLP process can use acoustic characteristics of emotions to classify speech samples into sentiment classifications. Table A below depicts a decision data structure for use in associating various voice characteristics into sentiment classifications. With use of a decision data structure, e.g., as depicted in Table A (Murray & Arnott (1993) manager system 110 can return sentiment parameter values in dependence on various voice conditions.

TABLE A

|  | Fear | Anger | Sadness | Happiness | Disgust |
|---|---|---|---|---|---|
| Speech Rate | Much Faster | Slightly Faster | Slightly Slower | Faster or Slower | Very Much Slower |
| Pitch Average | Very Much Higher | Very Much Higher | Slightly Lower | Much Higher | Very Much Lower |
| Pitch Range | Much Wider | Much Wider | Slightly Narrower | Much Wider | Slightly Wider |
| Intensity | Normal | Higher | Lower | Higher | Lower |
| Voice Quality | Irregular Voicing | Breathy Chest Tone | Resonant | Breathy Blaring | Grumbled Chest Tone |
| Pitch Changes | Normal | Abrupt on Stressed Syllables | Downward Inflection | Smooth Upward Inflections | Wide Downward Terminal Inflections |
| Articulation | Precise | Tense | Slurring | Normal | Normal |

With use of voice processing, as set forth in connection with Table A, manager system 110 running video sentiment extraction process 115 defines a Voice Tone Analyzer process which measures the sound of the user's voice as they conduct a conversation. This processing examines tone of voice, speech patterns, speech speed, and other data such as listed in Table A. Manager system 110 examining tone of voice, speech patterns, speech speed, and other data such as listed in Table A, in one embodiment, can employ predictive models trained by machine learning. Manager system 110 can use, e.g., word2vector modeling of a user conversation to find principal data and/or term frequency-inverse document frequency (TF-IDF) modeling of a user conversation to find principal data. There is set forth herein storing into a storage device a video data file; examining video file data defining the video data file, wherein the examining includes determining a relevancy of a section of the video data file; reducing a size of file data defining the section of the video data file in dependence on the determining the relevancy of the section of the video data file; storing a reduced-size version of the video data file into the storage device, the reduced-size version of the video data file having a reduced size relative to the video data file by performance of reducing the size of file data defining the section of the video data file in dependence on the determining the relevancy of the section of the video data file. In one embodiment, the determining the relevancy of the section of the video data file includes subjecting the section of the video file data to sentiment extraction, wherein the sentiment extraction includes examining a tone of voice of a speaker represented in an audio segment of the section of the video data file.

Factor F4 of Eq. 1 can be a user imperative factor. From time to time during a deployment period, manager system 110 can be activated to search video data of a user for specified topics mapping to entities in response to an established imperative. Examples of imperatives that can be established herein can include, e.g., a lost item imperative, an acquired item imperative, an ingestion activity imperative, or an exercise activity imperative. Imperatives are further described with reference to imperative invoking predictive model 3006 as described in connection with FIG. 3C.

Factor 5 of Eq. 1 can be a time factor. In one embodiment, video data files just recently updated into storage system 240 can be inferred to have significant relevance. Manager system 110 applying relevancy scoring under factor F4 can apply scoring values inversely proportional to an elapsed time from the time of upload of the video file into storage system 240 so that newer video files are assigned relatively higher scoring values and older video files are assigned relatively lower scoring values.

Figure 3C:
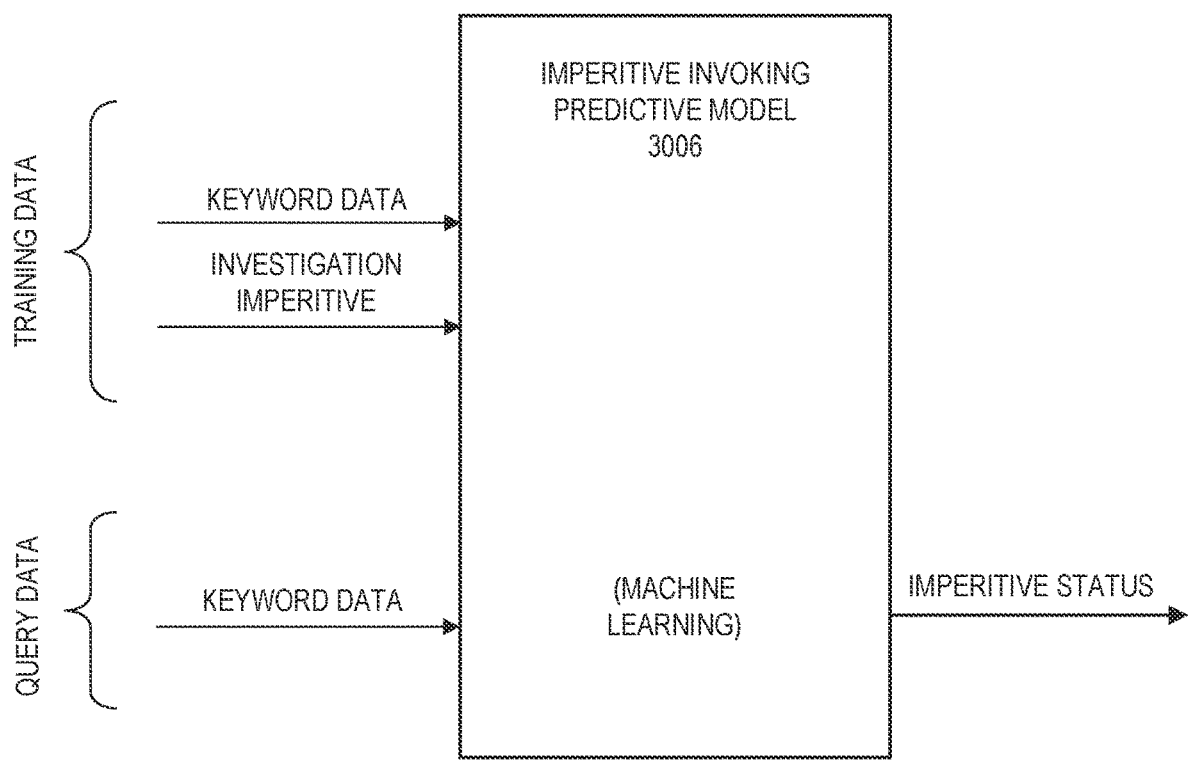
FIG. 3C depicts a predictive model, according to one embodiment.

Imperative invoking predictive model 3006 as shown in FIG. 3C can be trained with training data and once trained, imperative invoking predictive model is able to respond to query data. Training data for training imperative invoking predictive model 3006 can include iterations of training data. Each iteration of training data can include keyword data, e.g., one or more keyword embedded in a phrase in combination with (b) an investigation imperative label associated to the keyword data. In the described scenario, imperative invoking predictive model 3006 can be trained by way of supervised machine learning. Different phrases can be used to train on a common investigation imperative. For example, for training investigation imperative having the label "lost item," training phrases can include, e.g., "I lost my (entity); "Help me find my (entity); "Where did my (entity) go"; "I need to find my (entity)," and so on.

Trained as described, imperative invoking predictive model 3006 can learn a relationship between different phraseologies for keying a common investigation imperative, such as the described investigation imperative of lost item, acquired item, ingestion history, or exercise activity history.

Imperative invoking predictive model 3006, once trained, is able to respond to query data. Query data for querying imperative invoking predictive model 3006 can include keyword data. Keyword data can be data stream data taken from any data stream associated to a user, e.g., message data of a user presented in a messaging system such as social media system 140 or video data of a user. In one embodiment, a user can use the user's UE device to expressly invoke an imperative of the type described with reference to imperative invoking predictive model 3006. Alternatively, an imperative can be invoked passively, e.g., by way of manager system 110, as a matter of routine, examining incoming asset data associated to a user that is explained with reference to asset sending blocks 1203, 1204, and 4501.

When query data entered into imperative invoking predictive model 3006 has a threshold satisfying similarity to keyword data used to train a particular investigation imperative, imperative invoking predictive model 3006 properly trained can be expected to output status data indicating that the particular investigation imperative has been invoked. Where investigation imperatives have been invoked, manager system 110 at data size reduction block 1012 can ascertain whether a topic being evaluated by Eq. 1 matches a topic associated to an item referenced in an activated investigation imperative that has been invoked. For example, if an investigation imperative is the investigation imperative "I lost my keys" lost entity where entity equals "keys," manager system 110 in assigning a scoring value under factor F3, can assign a higher than baseline scoring value under factor F3 in the case that the topic being evaluated with use of Eq. 1 is the topic "topic equals keys." Manager system 110 applying scoring values under factor F1 can apply a higher than baseline scoring value in the case that the topic being evaluated using Eq. 1 matches a topic having a threshold exceeding relevance to the user and can assign a lower than baseline scoring value under factor F1 in the case that the topic being evaluated using Eq. 1 does not match a topic having a threshold exceeding relevance to the user.

Manager system 110 in performing data size reduction at block 1012 can perform data size reduction for an entire video data file on a section-by-section basis, wherein the different sections of the video data file are sections separated by scenes, according to the possible definitions herein, where the scenes are respectively defined by a plurality of frames. Manager system 110 for examining a given scene can provide a list of topics extracted from the scene, e.g., using the processing described with reference to block 1009 and can perform Eq. 1 to derive a relevancy score for each topic. Manager system 110, in one embodiment, can assign a relevancy score for a section in dependence on an aggregation of relevancy scores for an entirety of topics extracted from a section. In another embodiment, manager system 110 can assign a relevancy score for a section in dependence and based on the highest relevancy score assigned for any given topic. In such an embodiment, any extracted topic extracted from a section can result in the section being assigned a threshold exceeding high relevancy score. In another embodiment, the described sections of video data file can be defined by frames.

Manager system 110 can apply decision data structure as set forth in Table B for use in returning action decisions in respect to relevancy scores assigned to different sections of video data file of a user.

TABLE B

| Row | Relevancy score | Action Decision |
| --- | --- | --- |
| 1 | R > 0.7 | Preserve current file content |
| 2 | 0.5 < R <= 0.7 | Reduce resolution |

TABLE B-continued

| Row | Relevancy score | Action Decision |
|---|---|---|
| 3 | 0.2 < R <= 0.5 | Remove frames |
| 4 | R <= 0.2 | Freeze frame |

Relevancy scores above 0.7 can be regarded to be high. For the highest classification of relevancy, the action decision to take no action to preserve the original file content without data size reduction can be returned. For returned section relevancy of the second highest relevancy classification, the action decision to reduce frame resolution can be returned. When the action decision of Row 2 is returned, manager system 110 can reduce a pixel resolution of each frame making up a scene in a frame in a video data file. In the case that the section has the third highest relevancy classification, the action decision to go faster, i.e., remove frames of image data, can be returned. On the condition referring to Row 4, if the relevancy classification of the lowest relevancy classification is returned, the action decision of freeze frame can be returned. Freeze frame action decision is the action decision described earlier herein, wherein a single frame defining a scene is preserved and configured to result in extended time rendering playback of the frame for an extended time period, e.g., the combined rendering time period of the set of frames defining the scene in the original video data file prior to any data size reduction. In the described freeze frame example, data size reduction can include freezing a scene, e.g., by removing frames defining the scene and maintaining a certain single frame from a frame of image data defining a scene and configuring the single frame so that rendering playback time of the single frame is extended from a single frame playback time for the frame when rendering playback of the frame is performed using the original video data file uploaded by a user at block 1204 having an unreduced original data size. In one embodiment, the extended time consumes the rendering time of a set of frames defining the described scene when rendering is performed using the original full-size video data file uploaded at block 1204 and stored at block 1008.

Figure 4:
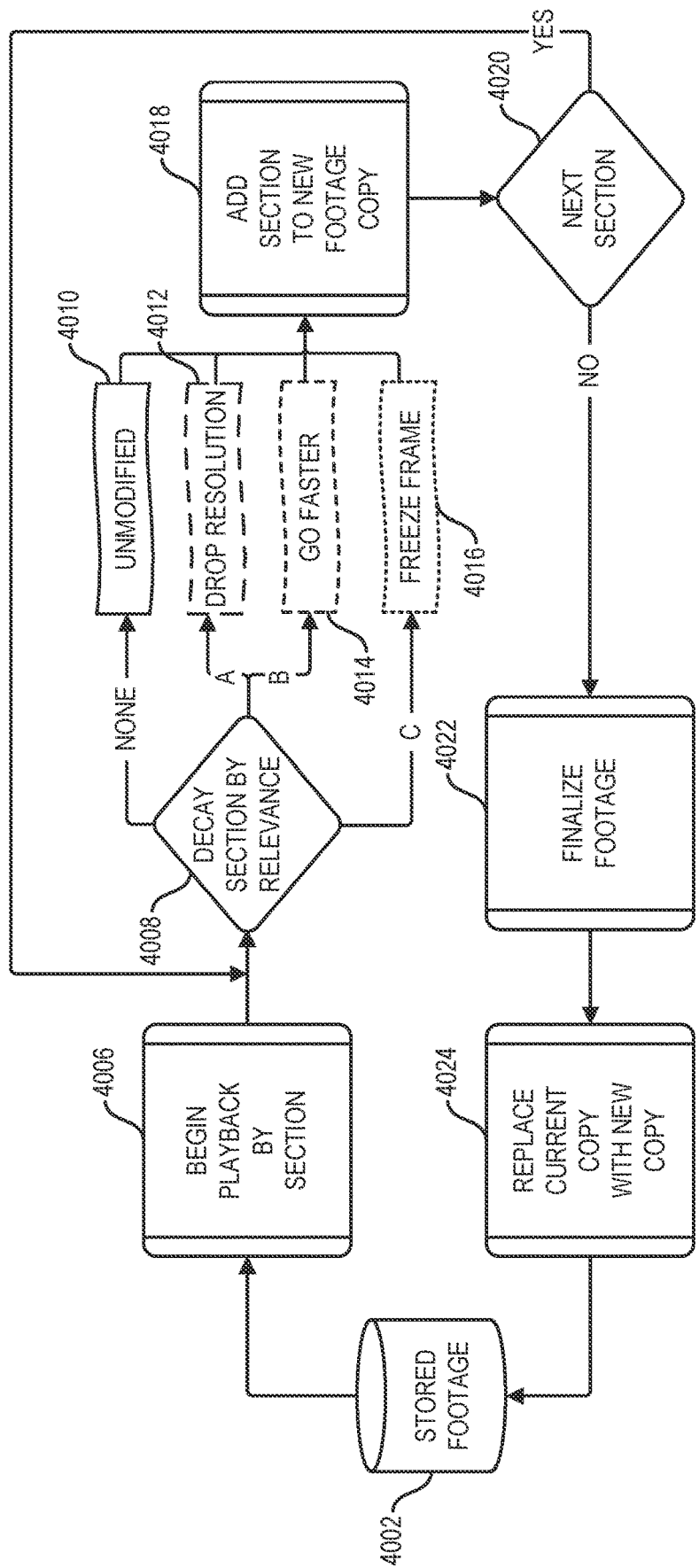
FIG. 4 depicts a method for performance by manager system, according to one embodiment.

Manager system 110 performing data size reduction at block 1012 is described further in reference to FIG. 4. At block 4006, manager system can begin playback of the stored video data file stored in memory associated to a certain user. Playback at block 4006, can be a virtual playback, i.e., without rendering, but can comprise playback in terms of playback for data examination and potentially file data size reduction.

At block 4008, manager system can ascertain whether an initial section of a video data file can be subject to data size reduction, i.e., decay, in accordance with the relevance determined for the section using Eq. 1. In the case of highest relevance of the section, the section can go unmodified as indicated by block 4010. In the case of second highest relevance, resolution of each frame defining the section and scene can be reduced. In the case of third highest relevance, frames of image data defining the scene can be removed so that playback speed is increased as indicated by block 4014. In the case of lowest relevance, all frames of the set of frames defining a scene can be removed except one frame, which can be configured to be played for a duration of the succession of frames defining the scene in the original video data file.

On completion of the appropriate action with respect to the section, manager system 110 can proceed to block 4018. At block 4018, manager system 110 can add the modified section modified by one of blocks 4012, 4014, or 4016 to the current video file and can proceed to block 4020. At block 4020, manager system 110 can ascertain whether the current video data file being subject to data size reduction has a next section. If yes, manager system 110 can return to block 4008 to reperform block 4008 and re-execute one of the actions 4010, 4012, 4014, or 4016. If, at block 4020, manager system 110 ascertains that the most recent section processed is the last section of a video data file, manager system 110 can proceed to block 4022.

At block 4022, manager system 110 can finalize the footage defining the current video data file and can proceed to block 4024. At block 4024, manager system 110 can replace the current copy of the referenced video data file with the new copy of the video data file finalized at block 4022. On completion of block 4024, manager system 110 can store the modified video data file into storage system 240, indicated by block 4002.

On completion of data size reduction block 1012, manager system 110 can proceed to return block 1013. At return block 1013, manager system 110 can return to a stage preceding block 1001 so that manager system 110 in computing environment 100 can receive a next iteration of registration data, e.g., new registration data from new users or modified registration data from existing users.

Computing environment 100 and manager system 110 can iteratively perform the loop of blocks 1001 to 1013 for a deployment period of computing environment and manager system 110. Embodiments herein recognize that relevancy of sections of video data file to a user can change over time. For example, in some embodiments, data size reduction block 1012 can be modified to be a data size adjustment block 1012 that facilitates increase in data size of a current video data file of a user. For example, embodiments herein have referenced archived original video data file which can be stored into lower tiered storage at the time that a first copy of video data file is stored into the priority storage device. Such an embodiment can facilitate restoration of full original data sized video data file sections in the event a relevance of a section increases over time. For example, the user may take up a new job or hobby or the like and may begin to post topics about the new endeavor. The relevance of topics associated to the new endeavor can be expected to increase to increase the relevance scores that are assigned by manager system to video data file sections having extracted topics matching topics associated to the endeavor. In such a situation, manager system 110 at block 1012 can automatically restore original frames of data defining original full-size full data size frames of image data defining a scene where the scene at block 1012 is determined to have a threshold exceeding relevance. Restoring frames of image data from an original video data file can include locating the original video data file from the appropriate storage location in storage system 240 uploaded at block 1204 and stored at block 1008, parsing the frames from the identified full data size video data file defining the scene and replacing the relevant one or more frame of image data from the current video data file stored in priority storage with the full data sized version of the frames parsed from the full size version of the video data file identified within storage system 240.

In one example, with data size reduction of a video data file herein, a user can more quickly review a video data file for relevant content. Embodiments herein recognize that data size reduction features herein can find use in evidence review applications, e.g., for home use by law enforcement entities and the like. In one example, manager system 110 can be configured to perform the described original frame restoration in response to a manual input control input by a user with use of a displayed user interface displayed on a display of a UE device of UE devices 120A-120Z associated to a user. For example, a user may be viewing a size reduced section of a video data file, and by viewing the size reduced portion can ascertain that viewing the original video data file may be useful. Manager system 100 can be configured so that a user can activate a control on the described displayed user interface to restore the pertinent size reduced frames by replacing frames of the current size reduced video data file or can simply cause rendering playback of the original video data file in the pertinent section thereof.

Embodiments herein recognize that relevancy of sections of video data files can change over time. For example, if a user takes up a new endeavor and posts about the new endeavor and schedules calendar events regarding the new endeavor, topics related to the new endeavor can increase and video data file content having extracted topics matching topics of the new endeavor can be expected to increase. Current events reported on in data sources from news aggregator system 150 can also derive relevancy scores assigned to video data files upwardly or downwardly over time. Referring to Eq. 1, it can be seen that the time factor can drive a relevancy score for a video data file section above a threshold associated to the no modification action decision for a first period of time, but after elapsed time, e.g., a month, a year, etc., the time factor will not drive the relevancy score for the section above the threshold. However, in the time that the time factor relevancy score decreases, the user may take up a new endeavor related to a topic associated to the video data file section to save the video data file section from modification even after elapsed time. Embodiments herein facilitate multiple avenues by which video data file can be maintained unmodified while permitting decay in other situations intelligently and systematically.

Embodiments herein can enable full-fidelity data capture of audiovisual feeds without incurring exorbitant storage costs that come from simplistic data retention policies. Embodiments herein enable a reasoned approach to data retention through the analysis of the value or usefulness (relevancy) of the data for a given purpose and consequent purposeful degradation. Embodiments herein can provide the ability to reliably classify footage in terms of usefulness so that so-called useless footage does not impact the cost of a video archival system.

Embodiments herein can provide replays of historical footage of a full-time video system to help determine what are key areas to tag as being 'useful' and relevant, and based on a relevancy determination, the video footage could be automatically edited and streamlined. Other factors such as sensing the environment as being hostile or amicable by checking sentiment can provide triggers for longer recording times by the system. Adding historical biometric data to correlate what is 'useful' footage, analyze and measure the video's visual field for vibration, and the audio system for sentiment can enable identification of heightened states of awareness and/or readiness to act, triggering activation of the video feed, further enabling the prioritization of the tagging, determination, editing, and streamlining.

Embodiments herein can provide a system where video footage section bit rate can be manipulated based on usefulness and relevancy. Video sections can be processed and re-processed at regular intervals to introduce this decay. Sections can be first classified according to usefulness, and assigned a corresponding decay value. This decay value can drive a secondary process which alters the segment to reduce it in size, using such techniques as removing fidelity, pixel counts, refresh rates, color depth vs grayscale, etc. A higher decay value has the effect of running the process on a particular footage section more often, thus whittling away at the section size more quickly than a segment classified as more useful and more relevant thus having a lower decay value.

According to one example, while the usefulness and relevancy of a video section showing a chase can be useful and relevant, the fidelity of the capture need not be high, as compared to the sections immediately prior and after the chase. Embodiments herein can preserve the full fidelity of the start, the length and aftermath, but can provide decay of the detail during the chase.

Embodiments herein can provide a method to assign usefulness and relevancy to video sections in dependence on multiple input sources to derive several measures of usefulness and relevance. A section of footage may be tagged as useful and relevant in dependence, e.g., on establishing environmental conditions (sunny, cloudy, rainy, windy) and/ or human conditions (duress, stress, heightened states of awareness and readiness, flight/flight responses, emotional state of a crowd).

Useful and relevant footage can include footage which captures and correlates state changes with the reason for such change. With multiple indicators including biometric benchmarking of usefulness and relevance being assigned to a given section, multiple decaying processes can be applied at regular frequency, thereby achieving preservation of footage that has multiple uses and bases for relevance and discarding that which serves little usefulness or relevance for many purposes. In some embodiments, indication of a higher decay rate is through the identification of closed circuit television (CCTV) capture points (e.g., cameras) in the video section.

Embodiments herein can provide an ability to reduce the quality of the content based on the contextual relevancy (of lack thereof) pertaining to the scope subject matter of the content. Embodiments herein can provide an ability to increase focus during reviews of video feed eliminating the need to review non-relevant and extraneous footage. Embodiments herein can provide an ability to retain the highest-quality, relevant footage based on scope and subject matter.

Embodiments herein, according to one aspect, can reduce the storage impact of audiovisual evidence while maintaining full-fidelity feed capture. Embodiments herein can provide adaptive compression methodology that can be driven by technical features of the data. Embodiments herein can provide a system that determines what is important to capture at a higher fidelity based on environmental and biometric inputs and analysis of scene.

According to one embodiment, audiovisual data that is to be decayed can have its bits averaged over larger areas. Embodiments herein can include a software content review circuitry which can be responsible for ingesting content and conducting the review and playback of video based content.

Embodiments herein can include a storage medium which can include a cloud-based offering. For example, cloud-based storage can be provided for both original unaltered content and the processed content that has been through the controlled decay processing that would alter (decay) hours of useless footage.

Embodiments herein can include a local-based offering. For example, both original content and editing (decayed)

content can be stored locally on a local network, e.g., on a user's UE device of a local network to reduce the size of consumed storage.

Embodiments herein can include defining content that is to be subject to data size reduction. Content can be subject to characterization pertaining to, e.g., origin, start, length, and end point. A baseline for content usage can be defined pertaining to a set of rules. These rules can be defined based upon detected events within the context of the video. For example, a rule can be established so that within security camera footage, when no object movement, no human movement, and no light changes are occurring within a video, proceed with a content controlled decay of video quality. In another example, a rule can be provided so that indexing of an entire video data file can be provided based on relevancy. Different actions can be assigned to video data file sections based on determined relevancy. Different actions can include, e.g.: (a) retain highest quality—Never alter or decay; (b) medium quality alteration—Perhaps events that are near high quality events; or (c) low quality alteration—Monotonous events that are repetitive in nature. Decay can be provided as defined by the indexing format metadata marking. There can be performed recalibrating an overall video file size based on the actions taken within the previous step. There can be performed iterative action rework if the user does not approve of the decay modeling.

In one embodiment, there can be performed updating all user knowledge corpus pertaining to the requirements of the subject matter for the preferred content approach (specific to content administrators) to control the intended decay rates of the content.

Figure 5:
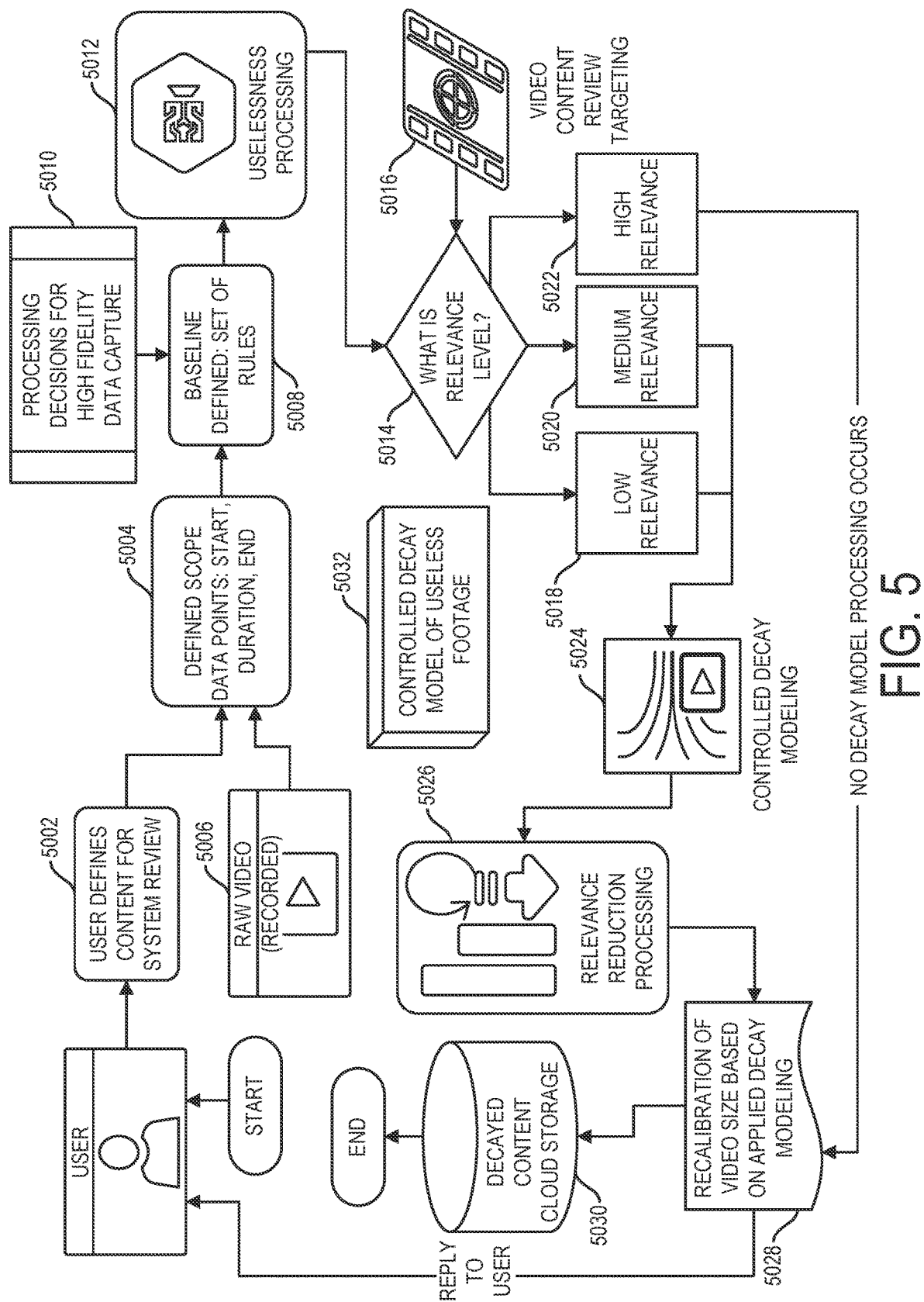
FIG. 5 depicts a method for performance by system, according to one embodiment.

In FIG. 5, with reference to blocks 5002-5030, there is set forth a process flow diagram illustrating an example of the method set forth in reference to the flowchart of FIG. 2. There is set forth, in one embodiment, the capability to enable full-fidelity data capture of audiovisual feeds without incurring exorbitant storage costs that come from simplistic data retention policies. Embodiments herein provide a reasoned approach to data retention through the analysis of the value or usefulness of the data for a given purpose and consequent purposeful degradation. Embodiments herein can provide an ability to reduce the quality of the content based on the contextual relevancy (of lack thereof) pertaining to the scope subject matter of the content. Embodiments herein can provide an ability to increase focus during reviews of video feed eliminating the need to review non-relevant and extraneous footage. Embodiments herein can provide an ability to retain the highest-quality, relevant footage based on scope and subject matter.

Various available tools, libraries, and/or services can be utilized for implementation of predictive model 3002, predictive model 3004, and/or predictive model 3006. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. Predictive models herein can incorporate use of, e.g., neural networks, support vector machines (SVM), Bayesian networks, Fourier curve fitting, Random Forests, regression analytics, and/or other machine learning technologies.

Certain embodiments herein may offer various technical computing advantages involving computing advantages and practical applications to address problems arising in the realm of computer systems. Embodiments herein can provide for data size reduction in a video data file. Embodiments herein can assign relevancy scores to sections of video data files, and a video data file section can be permitted to decay intelligently based on relevance. Various predictive models can be maintained and trained with use of machine learning to determine relevance of topics to users and relevance levels of topics from a global perspective. The predictive models described can be used to assign relevancy scores to video data file sections. In another aspect relevancy of a section of a video data file can be ascertained using video sentiment extraction. Various methods can be performed to facilitate reduction in video data file size, including reducing the pixel resolution of frames of image data defining a scene, removing frames of image data defining a scene, and freezing a scene, e.g., by configuring a single frame so that rendering playback time of the single frame is extended relative to a single frame playback time. In one embodiment, the extended time can consume the rendering time of a set of frames of an original full-size video data file. Certain embodiments include storing a video data file into storage devices defining different tiers of storage. An original fill size version of and video data files can be accessed for restoring sections of video data file that is stored in priority storage and which has been subject to data size reduction. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 6:
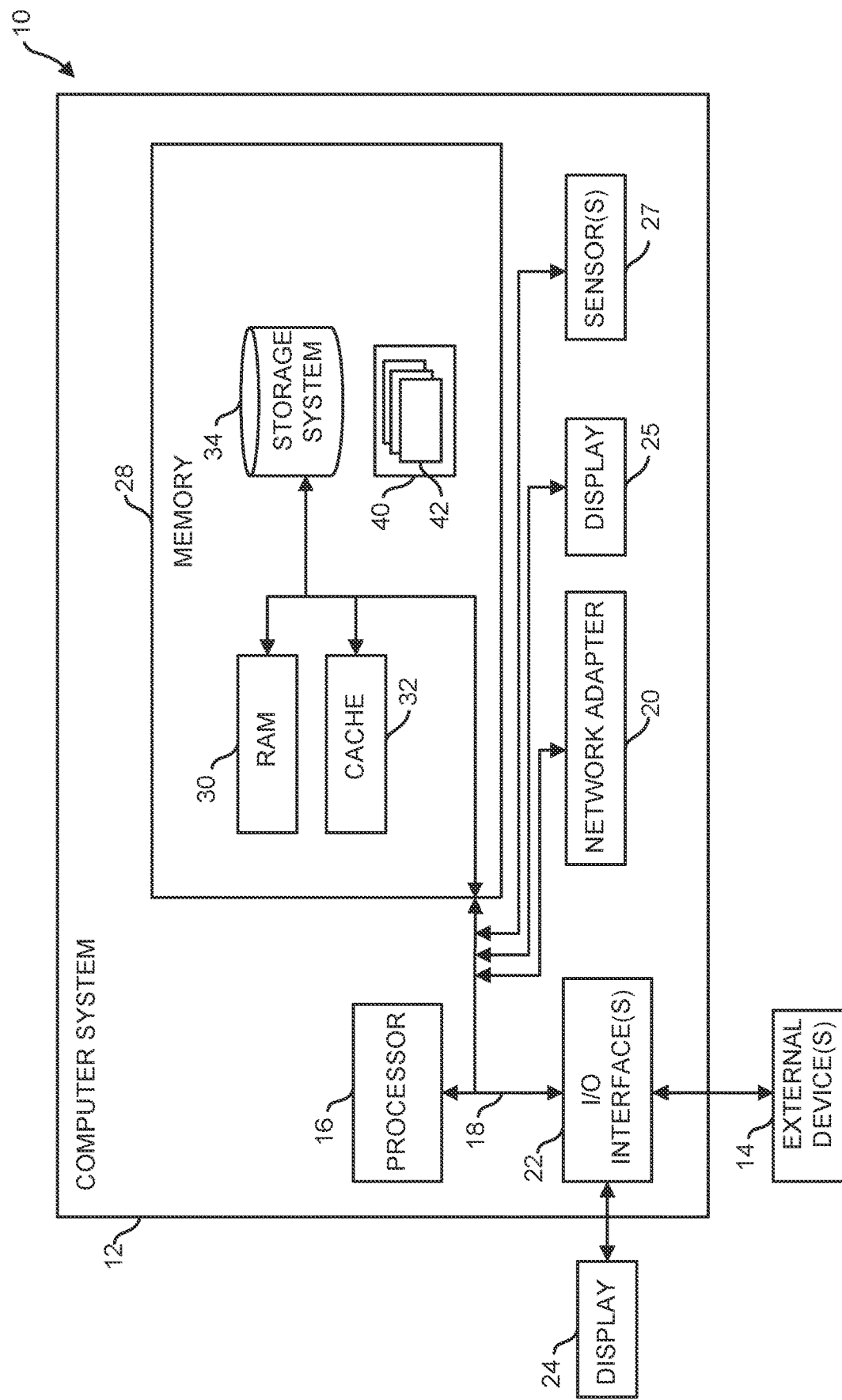
FIG. 6 depicts a computing node according to one embodiment.
Figure 7:
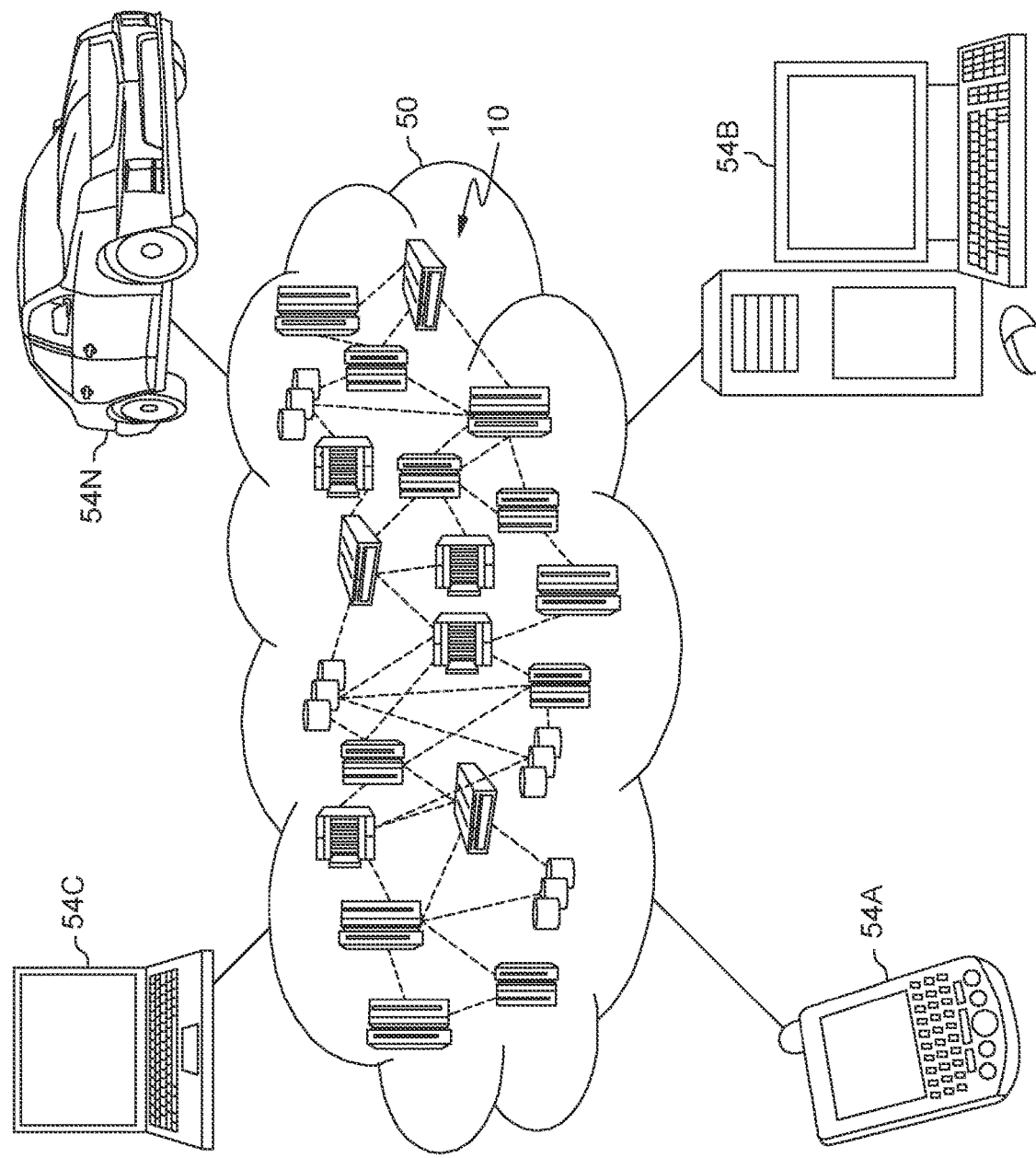
FIG. 7 depicts a cloud computing environment according to one embodiment.
Figure 8:
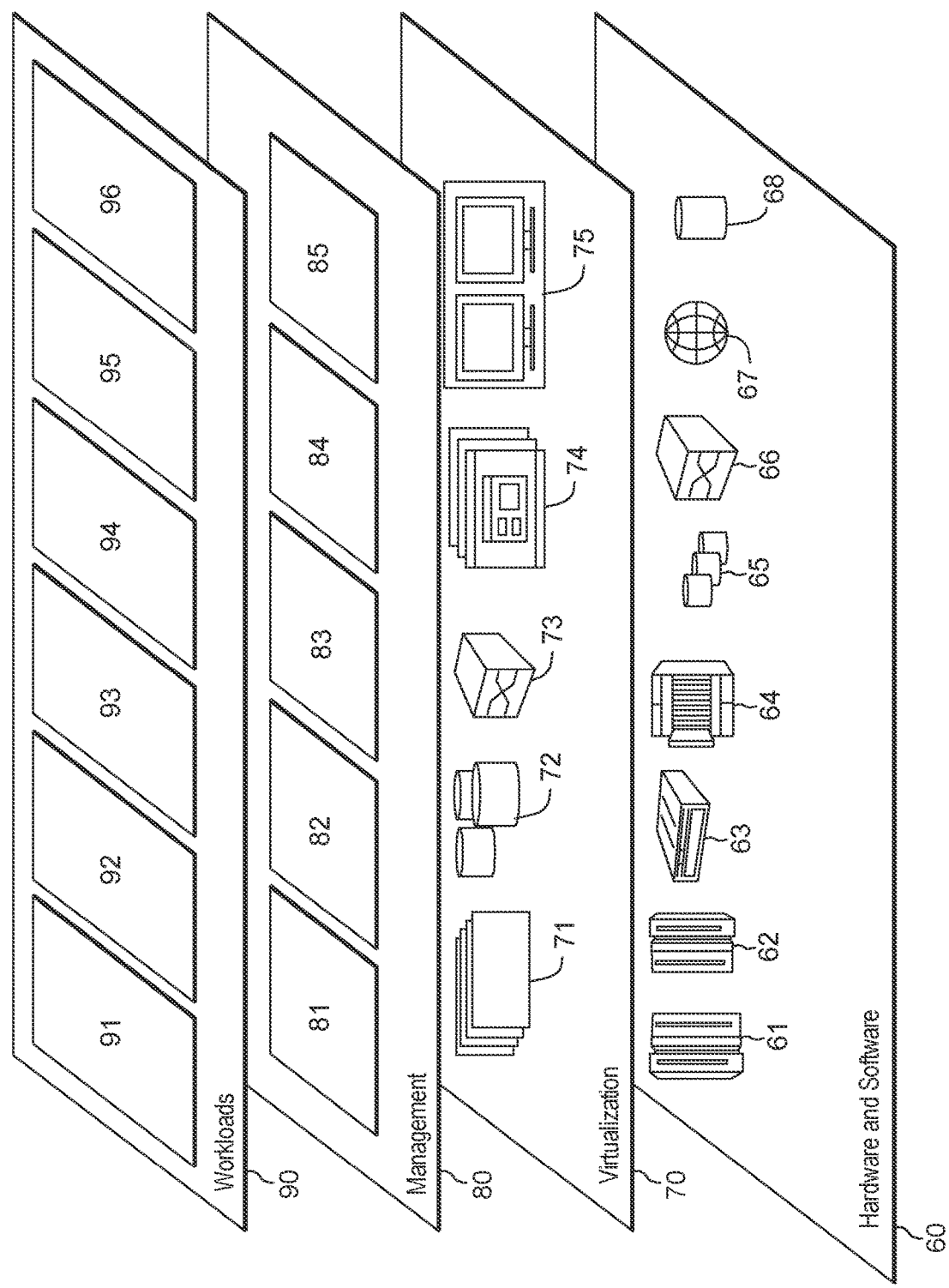
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to computing environment 100 as set forth in the flowcharts of FIG. 2, and FIGS. 4-5. In one embodiment, one or more UE device 120A-120Z can include one or more computing node 10 and can include one or more program 40 for performing functions described with reference to one or more UE device 120A-120Z as set forth in the flowchart of FIG. 2, and FIGS. 4-5. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   storing into a storage device a video data file;
   examining video file data defining the video data file, wherein the examining includes determining a relevancy of a section of the video data file;
   reducing a size of file data defining the section of the video data file in dependence on the determining the relevancy of the section of the video data file; and
   storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

2. The computer implemented method of claim 1, wherein the section of the video data file defines a scene of the video data file.

3. The computer implemented method of claim 1, wherein the section of the video data file defines a frame of the video data file.

4. The computer implemented method of claim 1, wherein the determining the relevancy of the section of the video data file includes subjecting the section of the video file data to topic extraction.

5. The computer implemented method of claim 1, wherein the determining the relevancy of the section of the video data file includes subjecting the section of the video file data to topic extraction for extraction of a certain topic from the section, and examining a relevancy of the certain topic to a user associated to the video data file.

6. The computer implemented method of claim 1, wherein the determining the relevancy of the section of the video data file includes subjecting the section of the video file data to image processing based topic extraction for extraction of a certain topic from the section, and examining a general relevancy of the certain topic, the general relevancy of the certain topic being determined by configuring a predictive model with use of historical data from a news aggregator data source.

7. The computer implemented method of claim 1, wherein the determining the relevancy of the section of the video data file includes subjecting the section of the video file data to topic extraction for extraction of a certain topic from the section, and ascertaining that the certain topic matches a topic referenced in an investigation imperative established by a user associated to the video data file.

8. The computer implemented method of claim 1, wherein the storing into a storage device a video data file is accompanied by a storing of the video data file into a second storage device defining a lower tier of storage relative to the storage device.

9. The computer implemented method of claim 1, wherein the storing into a storage device a video data file is accompanied by a storing of a copy of the video data file into a second storage device defining a lower tier of storage relative to the storage device, and wherein the method includes, subsequent to the reducing and the storing of the reduced-size version of the video data file, restoring original size video file data into the reduced-size version of the video data file, wherein the restoring includes using the copy of the video data file.

10. The computer implemented method of claim 1, wherein the determining the relevancy of the section of the video data file includes subjecting the section of the video file data to topic extraction for extraction of a certain topic from the section, and ascertaining a relevancy of the certain topic to a user associated to the video data file.

11. The computer implemented method of claim 1, wherein the reducing includes decreasing a pixel resolution of a frame of image data defining the section of the video data file.

12. The computer implemented method of claim 1, wherein the reducing includes removing one or more frame of image data defining the section of the video data file.

13. The computer implemented method of claim 1, wherein the reducing includes removing one or more frame of image data defining the section of the video data file, and configuring a frame of image data defining the section to be rendered for an extended rendering time.

14. The computer implemented method of claim 1, wherein the storing into a storage device a video data file is accompanied by a storing of a copy of the video data file into a second storage device defining a lower tier of storage relative to the storage device, and wherein the method includes, subsequent to the reducing and the storing of the reduced-size version of the video data file, restoring original size video file data into the reduced-size version of the video data file, wherein the restoring includes using the copy of the video data file, wherein the restoring is performed automatically responsively in response to a determination that a relevancy of the section of the video data file exceeds a relevancy threshold.

15. The computer implemented method of claim 1, wherein the method includes iteratively performing the reducing the size of file data defining the section of the video data file in dependence on iteratively performing determining the relevancy of the section of the video data file, wherein the method includes extracting a certain topic from the section of the video file, and wherein the iteratively performing the reducing the size of file data defining the section of the video data file includes (a) performing the reducing the size of file data defining the section of the video data file by a first method at a first time in dependence on a relevance of the certain topic to a user associated to the video data file at the first time, and (b) performing the reducing the size of file data defining the section of the video data file by a second method at a second time in dependence on a relevance of the certain topic to the user associated to the video data file at the second time.

16. The computer implemented method of claim 1, wherein the determining the relevancy of the section of the video data file includes subjecting the section of the video file data to sentiment extraction.

17. The computer implemented method of claim 1, wherein the determining the relevancy of the section of the video data file includes subjecting the section of the video file data to sentiment extraction, wherein the sentiment extraction includes examining a tone of voice of a speaker represented in an audio segment of the section of the video data file.

18. The computer implemented method of claim 1, wherein the determining the relevancy of the section of the video data file includes subjecting the section of the video file data to sentiment extraction, wherein the determining the relevancy of the section of the video data file includes subjecting the section of the video file data to topic extraction for extraction of a certain topic from the section, and examining a relevancy of the certain topic to a user associated to the video data file.

19. A computer program product comprising:
a computer readable storage medium readable by one or more processing circuit and storing instructions for execution by one or more processor for performing a method comprising:
storing into a storage device a video data file;
examining video file data defining the video data file, wherein the examining includes determining a relevancy of a section of the video data file;
reducing a size of file data defining the section of the video data file in dependence on the determining the relevancy of the section of the video data file;
storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

20. A system comprising:

a memory;

at least one processor in communication with the memory; and program instructions executable by one or more processor via the memory to perform a method comprising:

storing into a storage device a video data file;

examining video file data defining the video data file, wherein the examining includes determining a relevancy of a section of the video data file;

reducing a size of file data defining the section of the video data file in dependence on the determining the relevancy of the section of the video data file;

storing a reduced-size version of the video data file into the storage device, the reduced-size version of the video data file having a reduced size relative to the video data file by performance of the reducing the size of file data defining the section of the video data file in dependence on the determining the relevancy of the section of the video data file.

* * * * *